Patented Nov. 9, 1943

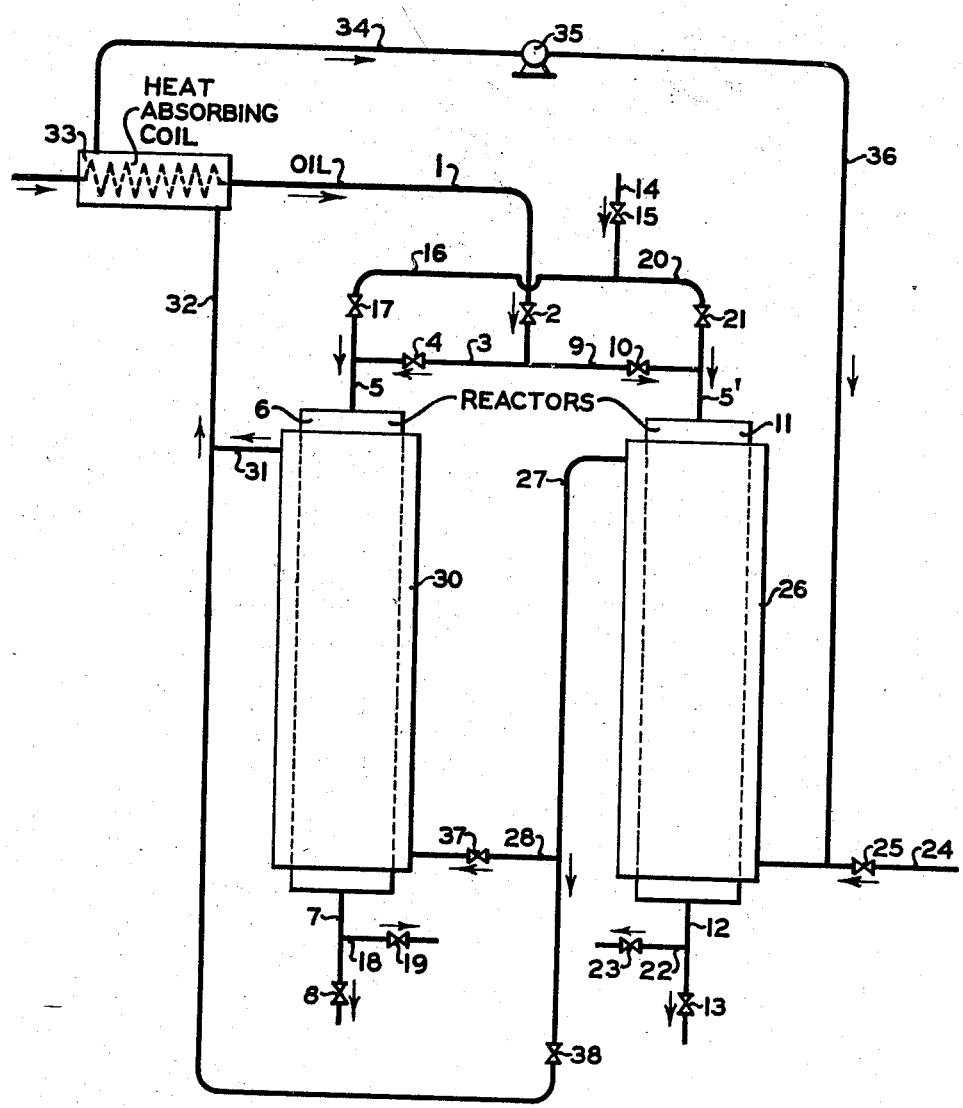

2,333,845

UNITED STATES PATENT OFFICE 2,333,845

METHOD OF TEMPERATURE CONTROL

Joseph D. Danforth, Chicago, Ill., assignor to Universal Oil Products Company, Chicago, Ill., a corporation of Delaware Application December 18, 1940, Serial No. 370,607

11 Claims. (Cl. 196—52)

This invention relates to processes for controlling reaction temperatures in combination processes involving both endothermic and exothermic reactions.

In a more specific sense the invention has reference to improvements in processes for heat conservation in catalytic processes in which the catalytic material is alternately used to promote hydrocarbon conversion reactions until it loses its efficiency due to the deposition of carbonaceous materials on its active surfaces and regenerated by burning off the deposit of carbonaceous materials with air or other oxidizing gas mixtures. Processes of this general character commonly employ reactors in parallel connection so that in one or more reactors, catalytic processing may be carried out while simultaneously in other reactors spent catalysts from previous process periods are undergoing regeneration. In such hydrocarbon conversion reactions as cracking, dehydrogenation, dehydrocyclization, gasoline reforming, etc., there is an absorption of heat, while in all regenerations involving the burning off of carbonaceous residues from catalysts, there is an evolution of heat.

In order to conserve heat in such combination processes, it has been proposed to circulate fluid heat transfer media successively around the endothermic and exothermic reactors in the processing and regenerating steps, respectively, so as to transfer heat from the reactor at the higher to the reactor at the lower temperature level, which serves the two-fold purpose of preventing too great a temperature drop in the endothermic zone and too high a temperature rise in the exothermic zone. Various transfer media have been proposed for use in such cases, such as water and other normally liquid compounds under pressure, aqueous solutions of salts and various single fused salts and mixtures of fused salts, particularly low melting eutectic mixtures.

In one specific embodiment, the present invention comprises a process for transferring heat from exothermic reaction zones to endothermic reaction zones in combination endothermic-exothermic processes which consists in circulating fluid media in indirect heat exchange relationship with the exothermic zones to decompose said media and passing the products of decomposition into indirect heat exchange relationship with the endothermic reaction zones to effect the absorption of the heat of decomposition and cause the recombination of the decomposition products at a lower temperature.

The present invention preferably utilizes substantially completely reversible systems to effect heat transfer and heat conservation in combination endothermic-exothermic catalytic processes. As an example of a substance suitable for this service, the compound nitrogen peroxide may be cited. This compound dissociates according to the following general equation:

$$NO_2 \rightleftharpoons NO + \tfrac{1}{2}O_2 - \text{approx. 14,000 cal.}$$

The percent dissociation of $NO_2$ at atmospheric pressure varies with the temperature as shown:

| Percent dissociated  | Temp., °C. |
|---|---|
| 5 | 184 |
| 13 | 279 |
| 56.5 | 494 |
| 100 | 619.5 |

The products of the left to right reaction combine on cooling to reform the nitrogen peroxide suitable for recycling so that this reversible reaction is particularly suitable.

Another type reaction which may be employed is the following: 

$$4HCl + O_2 \rightleftharpoons 2H_2O + 2Cl_2 + 27,530 \text{ cal.}$$

In the case of this reaction, the equilibrium at 510° C. corresponds to about 75% of the components on the right hand side of the equation and 25% on the left hand side of the equation while at 650° C. the figures are 5% and 95% respectively.

In operating the present process for example in connection with a catalytic cracking plant involving reactors in which processing is taking place and reactors in which the spent catalyst is being regenerated, nitrogen peroxide is passed around the reactors in which regeneration is progressing and the decomposition products passed around the reactors which are in the processing stage, continuous circulation being maintained by means of pumps or blowers. It will be obvious that since different amounts of heat may be encountered in the processing and regeneration zones, due both to the actual amounts of heat liberated in the processing and regenerating reactions and the different temperature levels which may be found optimum to maintain in each, it may be expedient to employ additional heat regulating means placed along the line of flow of the heat transfer media and such means are comprised with the scope of the invention. In the case of nitrogen peroxide as a compound representative of the class which may be employed, it is completely dissociated at atmospheric pressure (as shown in the above table) at temperatures of the order of 620° C. which temperature approaches the maximum allowable in reactivation of certain synthetic silica-alumina cracking catalysts so that maximum advantage can be taken of the heat of dissociation. On the other hand, it will be observed that this compound is approximately 50% dissociated at a temperature of approximately 500° C. with changes within a temperature range frequently employed in chemical cracking processes so that about 50% of the heat involved in recombination may be utilized in maintaining the temperature of a catalytic cracking zone.

While the above description of the method of operating the present process is given in connection with a particular compound, it is not intended to thereby limit the scope of the invention to use of this compound since any other compound capable of reversible dissociation within the temperature ranges employed in catalytic cracking or other processes may be employed. It is advantageous in operating the type of endothermic-exothermic combination process mentioned to utilize reactors consisting of banks of relatively small diameter tubes between distributing headers since the maintenance of the exact temperature control is frequently necessary to effect best results and rapid heat transfer is obviously favored by the use of a large number of small tubes rather than by the use of large diameter reactors.

In order to indicate the general types of processes to which the present invention is applicable, a description of a characteristic operation is given in connection with the attached drawing which is merely diagrammatic and not drawn to any absolute or relative scale, merely showing by the use of conventional figures in general side elevation, an arrangement of apparatus in which the process may be carried out.

Referring to the drawing, the principal units are two equivalent jacketed reactors 6 and 11 which have been shown as of vertical cylindrical type although they are to represent any specially designed reactor which may more often consist of banks of small tubes between headers. It will be obvious that in any heat-conserving process, such as the present one that all parts of the apparatus, including reactors and lines will require careful insulation to prevent accidental heat losses, even though such insulation is not indicated in the present drawing. Other minor features have also been omitted with no idea of detracting from characteristic representation of the process by the schematic flow.

As indicated in the drawing, line 1 containing valve 2 may be used for admitting hydrocarbons for processing either to reactor 6 by way of line 3 containing valve 4 and leading to line 5 or by way of line 9 containing valve 10 and leading line 5'. This arrangement makes possible the alternate use of either reactor for processing such materials as vapors of hydrocarbons to be subjected to catalytic cracking.

As shown in the drawing, line 14 containing valve 15 permits the admission of reactivating gas mixtures such as air or oxygen-containing combustion gas which may pass to reactor 6 by way of line 16 containing valve 17 and line 5 and to reactor 11 by way of line 20 containing valve 21 and line 5'. In case reactor 6 is on processing cycle and reactor 11 is on reactivation cycle, valves 4 and 21 will be open while valves 17 and 10 will be closed. In the reverse case, valves 10 and 17 will be open while valves 4 and 21 will be closed.

Reactor 6 has bottom draw line 7 containing valve 8 to permit the recovery of conversion products during the processing cycle, these being sent to fractionating and other suitable recovery equipment while branch line 18 containing valve 19 acts as a vent line for spent reactivation gas. Similarly, in the case of reactor 11 a line 12 containing valve 13 permits the recovery of conversion products when this reactor is on processing and branch line 22 containing valve 23 permits the disposal of the spent reactivation gases.

In the above description of the flow through the two parallel reactors, it is assumed that both the processing and the reactivation are effected during downflow of the entering fluids although it may occasionally be better practice to utilize upflow.

In order to effect heat transfer between reactors 6 and 11 while reactor 6 is on processing and 11 is on reactivation, a decomposable and reversibly recomposable compound or mixture of reactants may be admitted through line 24 containing valve 25 to jacket 26 surrounding reactor 11 to undergo decomposition or reaction respectively with the absorption of heat, the products of the reaction then passing through line 27 and being divided into two streams, one entering jacket 30 by line 28 containing valve 37 and the other stream passing through valve 38. In this way a temperature control can be obtained by regulating the proportion of gas passing through the endothermic reaction zone. The gas mixture leaving jacket 30 will have been recomposed to nitrogen dioxide to an extent depending upon temperature of the reactor and the rate of flow therethrough. This gas mixture then is blended with the mixture from line 27 and is preferably passed to a heat exchanger 33 which may be for preheating charging oil to a catalytic conversion process or may be a waste heat boiler for the generation of power. In the heat exchange step the temperature of the gas mixture is preferably lowered to a point at which substantially complete recomposition of the nitric oxide and oxygen is effected so that substantially only nitrogen dioxide is recycled to the exothermic reaction chamber jacket by way of line 34 in which a pump 35 is preferably interposed. Lines necessary for reversing the flow through the heat exchanger and the jacket have not been shown in the drawing but it is to be understood that these can be supplied when the two characteristic chambers in parallel connection are reversed as to processing and reactivation stages.

While it has been indicated that it is generally preferable to completely recompose the originally introduced heat carrying fluid by means of the heat exchanger shown, it is nevertheless comprised within the scope of the invention to recirculate either partially recomposed fluid or to use other devices for controlling the amount of heat added to the reaction zone by the circulating fluid such as, for example, the insertion of a heat control device in connecting line 27.

It is further comprised within the scope of the invention to utilize a substantially inert diluent gas such as nitrogen or carbon dioxide in admixture with the decomposable fluid heat transfer medium. The use of diluent gases may serve in some instances to obviate the possibility of accidental corrosion in cases of processes used in ordinary types of steel constructed apparatus, and in which jacket heat is given out to maintain the temperature of reactor 6 by the recomposition of the reaction products from jacket 26.

To complete the cycle the recomposed material passes into line 31 and through a recycle pump or compressor 35 to be discharged through line 33 back to line 24 and thus again into jacket 26 to repeat the cycle. When desired conditions of heat transfer are once established, line 24 will obviously be used only for admission of make-up materials.

As an example of the practical operation of the present process, the following is introduced although not with the intention of limiting the scope of the invention in exact correspondence therewith.

Nitrogen peroxide is used to transfer heat of reactivation in a cracking process employing a granular synthetic silica-alumina catalyst composite in parallel reactors as described in connection with the foregoing specification. The vapors of a gas oil are subjected to contact with the fresh granular catalyst at a temperature of 500° C. and substantially atmospheric pressure in a primary reactor. Simultaneously, a reactor containing spent catalyst from a similar processing period is subjected to the action of a combustion gas mixture containing from 2 to 5% oxygen to burn off the hydrocarbonaceous deposits from the catalyst surfaces. With the type of catalyst mentioned, the maximum allowable temperature at reactivation is of the order of 620° C. By continuously introducing nitrogen peroxide gas into indirect heat exchange relationship with the reactor in which the catalyst is undergoing regeneration and passing the products of decomposition in indirect heat exchange relationship with the process unit, the optimum temperature of 500° C. is maintained in the catalytic cracking zone. If the catalyst and primary reactor become spent due to carbonaceous deposits on the catalyst and the other reactor has been revivified, a switch may be made so that the flow of the gas around the reactor is reversed.

It is within the scope of the invention to employ pressures in the circulating fluid zone within the range of from atmospheric to as high as 500 pounds per square inch although as a rule pressures above 50 pounds per square inch will seldom be used. Also the reacting fluids may be diluted if desired with varying amounts of an inert diluent such as nitrogen which may, if found advantageous, constitute as high as 95% of the total circulating gas mixture.

I claim as my invention:

1. A process for transferring heat from an exothermic reaction zone to an endothermic reaction zone disposed out of heat conductive relationship with the exothermic zone, which comprises passing an endothermically decomposable fluid substance in indirect heat exchange relationship with said exothermic zone to decompose said substance and thereby extract heat from said exothermic zone, passing at least a portion of each of the products of decomposition into indirect heat exchange relationship with said endothermic reaction zone to exothermically recompose said substance, and recycling said fluid substance to indirect heat exchange relation with said exothermic zone.

2. A process for transferring heat from an exothermic reaction zone to an endothermic reaction zone disposed out of heat conductive relationship with the exothermic zone, which comprises passing a mixture of fluid reactants in indirect heat exchange relationship with said exothermic zone to effect endothermic reaction between said reactants and thereby extract heat from said exothermic zone, passing at least a portion of each of the products of said reaction into indirect heat exchange relationship with said endothermic reaction zone to effect reversed exothermic reaction between the products of the first reaction and recycling the products of said reversed reaction to indirect heat exchange relation with said exothermic zone.

3. A process for transferring heat from an exothermic reaction zone in which carbonaceous deposits are being burned from a granular catalyst to an endothermic reaction zone in which a granular catalyst is being used to effect a hydrocarbon conversion reaction which comprises passing an endothermically decomposable fluid substance in indirect heat exchange relationship with said exothermic zone to decompose said substance and thereby extract heat from said exothermic zone, passing the products of decomposition into indirect heat exchange relationship with said endothermic reaction zone to exothermically recompose said substance and continuously recycling said fluid substance to indirect heat exchange relation with said exothermic zone.

4. A process for transferring heat from an exothermic reaction zone in which carbonaceous deposits are being burned from a granular catalyst to an endothermic reaction zone in which a granular catalyst is being used to effect a hydrocarbon conversion reaction which comprises, passing a mixture of fluid reactants in indirect heat exchange relationship with said exothermic zone to effect endothermic reaction between said reactants and thereby extract heat from said exothermic zone, passing the products of said reaction into indirect heat exchange relationship with said endothermic reaction zone to effect reversed exothermic reaction between the products of the first reaction and continuously recycling the products of said reversed reaction to indirect heat exchange relation with said exothermic zone.

5. A process for transferring heat from an exothermic reaction zone to an endothermic reaction zone which comprises passing nitrogen peroxide in indirect heat exchange relationship with said exothermic zone to decompose said nitrogen peroxide into nitric oxide and oxygen and thereby extract heat from said exothermic zone, passing said nitric oxide and oxygen into indirect heat exchange relationship with said endothermic reaction zone to effect the reformation of said nitrogen peroxide by absorption of heat and continuously recycling said nitrogen peroxide to indirect heat exchange relation with said exothermic zone.

6. A process for transferring heat from an exothermic reaction zone to an endothermic reaction zone at a lower temperature which comprises passing nitrogen peroxide in indirect heat exchange relationship with said exothermic zone to decompose said nitrogen peroxide into nitric oxide and oxygen and thereby extract heat from said exothermic zone, passing said nitric oxide and oxygen into indirect heat exchange relationship with said endothermic reaction zone to effect the reformation of said nitrogen peroxide by absorption of heat and continuously recycling said nitrogen peroxide to indirect heat exchange relation with said exothermic zone.

7. A process according to claim 1 in which the decomposable fluid substance is in admixture with a substantially inert non-reactive gas.

8. A process according to claim 6 in which the nitrogen peroxide is mixed with a substantial amount of an inert and substantially non-reactive gas.

9. A process for transferring heat from an exothermic reaction zone to an endothermic reaction zone disposed out of heat conductive relationship with the exothermic zone, which comprises passing in indirect heat exchange relation with said exothermic zone a fluid material capable of undergoing endothermic reaction at the temperature of the exothermic zone, endothermically reacting said material while in indirect heat exchange relation with the exothermic zone whereby to extract heat from said exothermic zone, said reaction of the fluid material being reversible on cooling of the reaction products, passing at least a portion of each of the reaction products of said fluid material in indirect heat exchange relation with said endothermic zone to recompose said fluid material, and returning the thus recomposed fluid material into indirect heat exchange relation with the exothermic zone.

10. The process as defined in claim 9 further characterized in that said fluid material comprises hydrogen chloride and oxygen.

11. The process as defined in claim 9 further characterized in that said fluid material comprises nitrogen peroxide.

JOSEPH D. DANFORTH.